United States Patent Office 3,243,777
Patented Mar. 29, 1966

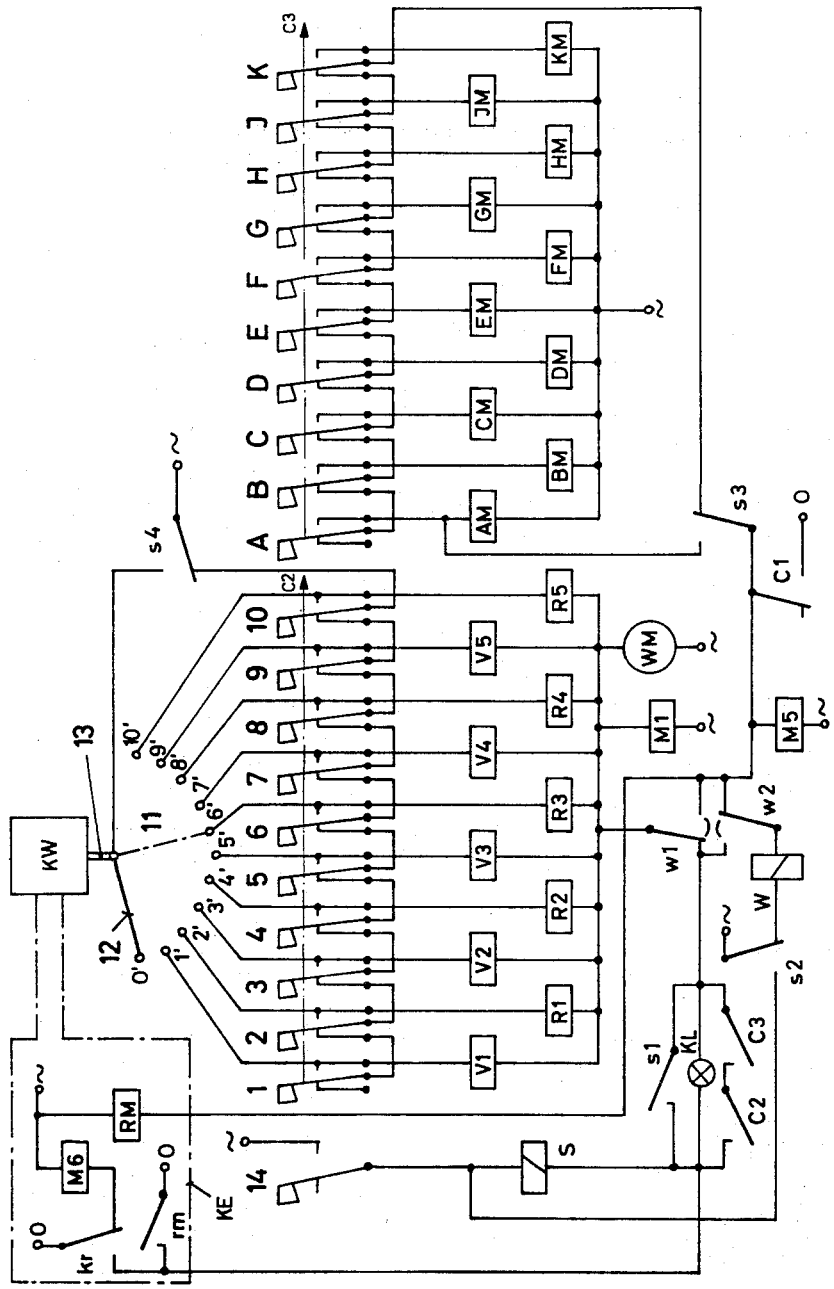

---

3,243,777
GROUP AND INDIVIDUAL RECORD SELECTION MECHANISM FOR COIN OPERATED RECORD PLAYING MACHINES
Friedel Horstmann, Espelkamp-Mittwald, Germany, assignor to Fa. Wilhelm Harting Werk fuer Elektrotechnik und Mechanik, Espelkamp-Mittwald, Germany, a corporation of Germany
Filed Dec. 18, 1964, Ser. No. 419,613
Claims priority, application Germany, Dec. 19, 1963, H 51,178
2 Claims. (Cl. 340—162)

This invention relates to a selection mechanism for a coin operated record exchange mechanism of automatic record playing machines. More specifically stated, the subject matter of this invention consists of a selection mechanism for a coin operated automatic record player, which permits the preselection of a whole program of records and also includes means for the preselection of single records.

The preselection of a whole program of "hit" records obviates the necessity of:

(a) locating and mentally assembling the program of "hit" records from a long list of records in tabular form and (b) activating the selection mechanism for each individual "hit" record of the program; the selection mechanism generally comprising a selector key which has to be manually depressed.

Preselection means for a program of records are already known in the art. Such means generally comprise a program key which, when manually depressed, either activates:

(a) a special electromagnet which simultaneously depresses a number of pins, corresponding to the number of records of the selected program. These pins, when electromagnetically activated move into the paths of a detecting mechanism, which then successively places the preselected records into their operative playing positions; or (b) a stepping mechanism which successively pushes a number of pins into the path of a detecting mechanism. This stepping mechanism is controlled and activated by the credit steps of a credit mechanism.

The preselection means described in paragraph (a) supra are of relatively simple construction but have, however, an important drawback in that the total number of records of the program must be selected as a group which in turn requires, of course, the insertion of the required minimum amount of coins into the machine.

The preselection means described in paragraph (b) supra can be operated so that only a single record and, depending on the remaining credit, a part of the records forming a program can be preselected; or alternatively, the whole or only a part of the records forming the program can be preselected depending on the amount of coins that have been inserted into the machine. The aforedescribed preselection mechanism has, however, the important drawback in that the aforedescribed means require a complicated circuitry and numerous actuating switches. This type of known selection mechanism is, for instance, described in the published German utility Model No. 1,880,493 (assignee Christoph Emmerich K.G.).

It is, therefore, an object of this invention to provide preselection means which have all of the advantageous operating characteristics of the preselection means described in paragraph (b) supra, but which do not require complicated circuitry and switching means.

Generally describing the invention, the novel preselection mechanism comprises a plurality of arresting magnets, which are selectively activated for the preselection of records, that is to say record sides. The aforementioned plurality of arresting magnets are mounted parallel to the working contact means of the preselection means, which generally are embodied as selector keys, and are operatively connected to bank contacts of a step or sequence switch (multicontact switch). The connecting member of this multicontact switch makes sliding contact with a preselected contact of the switch which is operatively mechanically controlled by the credit mechanism which guides this connecting member into position according to the credit stored therein. When a credit has been stored in the credit mechanism, a program key of the preselection means is selected and depressed corresponding to the program that has been selected. The depression of the program key causes a self-retained relay to be activated via a contact and thereby places the relay under operating voltage which places the arresting magnets of the preselection mechanism into operative position in accordance with the stored credit. Simultaneously therewith a cutoff of the operating voltage for the selecting means, such as selector keys, as well as for single record selector relays takes place via additional contacts of said self-retained relay. Furthermore, a control magnet is energized for a short time by the activation of said self-retained magnet which causes a pin, corresponding to a selected side of a record of a group of records forming a playing program, to be pushed into operative position. This short time energizing of the control magnet takes place via a circuit that is only energized during the selection operation. Lastly the selection motor of the preselection mechanism is also energized due to the activation of said self-retained relay.

The novel features which are characteristic for the invention are set forth in particular in the appended claims. The invention itself, however, both as to its construction and its method of operation, together with additional objects and advantages thereof, will be best understood from the following description when read in conjunction with the accompanying circuit diagram in which:

FIG. 1 is a circuit and wiring diagram illustrating schematically the preselection mechanism of this invention.

The numerals 1 . . . 10 illustrate the single record selector keys and their working contacts. These contacts are operatively connected as illustrated with the arresting magnets V1 . . . V5 for the top sides of the records and the arresting magnets R1 . . . R5 for the bottom sides of the records. These working contacts are further operatively connected as illustrated to the bank contacts 1' . . . 10' of a multicontact switch 11. A connecting member 12 which is operatively mounted in said multicontact switch makes sliding contact with a preselected bank contact of the bank contacts 1' . . . 10'. A shaft 13 mechanically connects the connecting member 12 to a credit mechanism designated as KW. The credit mechanism KW, depending on the amount of coins inserted therein and further depending on the stepwise reduction of the stored credit due to selection of records, controls the movement of the connecting member 12. Assuming coins in the amount of 1 German mark (25 cents for example in the United States) has been inserted into the credit mechanism of the record playing machine, a credit of six record sides would be stored in the credit mechanism KW which would cause the connecting member 12 to move over and make sliding contact with the bank contact 6' as illustrated by means of a dot-dash line in the circuit diagram.

A selector key 14 is provided which when depressed causes the playing of a program of "hit" records when a sufficient credit is available. Due to a stored credit a switching (separation) of a credit contact switch occurs at the time of 0-potential in a coin locking magnet M6 (opposite to what is illustrated in the circuit digram). In this manner the selection of individual record sides can be obtained by depressing the individual record selector keys 1 . . . 10 and the group selector keys A . . . K. When one of the selector keys 1 . . . 10 and of the selector keys A . . . K are depressed their respective common contact bars C2 and C3, which are mounted in a row, energize, via a static make-and-break contact S4 of the unexcited relay S, as well as via a static make-and-break contact W1 of the selector relay W, one of the arresting magnets V1 . . . V5 respectively R1 . . . R5, thereby placing said arresting magnet into an operative position. During this operation the connecting member 12 is not energized and consequently can not operatively affect the arresting magnets via one of the banking contacts. Simultaneously with the aforedescribed a credit indicating light KL turns off due to the bridging of its circuit by the contact bars C2 and C3, and the selector motor WM, which is connected in parallel with the circuit of the arresting magnets, is energized. The selector motor WM connects intermittently the contact C1 with the 0-potential of the electrical energy source (contrary to what is illustrated in the circuit diagram) by means of a mechanical coupling mechanism (not illustrated). In this manner, the energization of one of the pin magnets AM . . . KM takes place, thereby placing its respective pin into operative position when one of said pin magnets AM . . . KM is connected via a static make-and-break contact s3 of a relay S to the common phase potential. The energized pin magnet corresponds to the working contact of a corresponding depressed selector key to the group of selector keys A . . . K. In this manner the group and final record selector takes place. The intermittent switching of contact C1 to the 0-potential causes not only the energizing of the magnet M5 but also of the position restorer magnet RM. The magnet M5 controls the actuation of the record magazine (not illustrated). The position restorer magnet RM is schematically illustrated as mounted in dot-dash credit operating unit KE. When the position restorer magnet RM is energized the credit mechanism KW is reset so that the connecting member 12 makes now sliding contact with the bank contact 5'. Also by means of contact C1 the selector relay W is energized and placed into operative position by means of an overlap-switching make-and-break contact w2 and via the contacts C2, C3 and kr, thereby disconnecting the 0-potential emanating from credit contact kr by means of another overlap-switching make-and-break contact w1 from the arresting magnets V1 . . . V5 respectively R1 . . . R5 as well as the selector motor WM. Furthermore the magnet M1 which holds the depressed selector key of the group of selector keys 1 . . . 10 in position is disconnected from the 0-potential and releases the key. After the contact C1 assumes the position as illustrated in the circuit diagram the following occurs: the corresponding arresting and pin magnets which took part in the record selecting operation are deenergized; and position restorer magnet RM, the magnet M5, the selector-key-position-retention magnet M1 and the selector motor WM are also deenergized; in the meantime the selector relay W, due to the opening of at least the contact bar C2 of the selector keys, is only still in electrical contact with the 0-potential via the now again lit high ohmic resistance indicating light KL, and therefore the selector relay also is deactivated. Since a credit remains in the credit operating unit KE, the record side selecting operation can continue either automatically or by individual selection. After the credit mechanism KW and its connecting member 12 have been restored to the 0' position as illustrated in the circuit diagram, the credit contact kr also returns to the position of the circuit diagram. This causes the energizing of the coin locking magnet M6 so that coins can again be inserted and simultaneously therewith the selector circle together with the credit indicating light KL are deenergized by disconnection from the 0-potential. If a selection of a group of "hit" records, corresponding to a given amount of credit, is to be made, the group selector key 14 is depressed. The record selecting operation takes place as follows: Assuming again that coins amounting to a credit of six records have been inserted into the credit operating unit KE, the connecting member 12 will come to rest on and make contact with the banking contact 6' (as illustrated with a dot-dash line in the circuit diagram). Let us further assume that three "hit" records form part of the selected group. These "hit" records are selected by depressing group selector key A which activates pin magnet AM and then, by means of arresting magnets V1 . . . V3 and R1 . . . R3, causes a successive playing of the selected "hit" record sides. If these record sides had been selected individually the selector keys 1 . . . 6 would have been required to be depressed. However, due to the depressing of the group selector key 14 the relay S is energized via the credit contact kr, which is connected with one coil end to 0-potential (opposite to what is illustrated in the circuit diagram), by conducting the phase potential to its other coil end. After the group selector key 14 has been released the key 14 remains positioned and in contact with respect to the phase potential of the electrical source via the working side of its make-and-break contact w1. This causes a bridging of the relay S circuit by its now closed working contact s1 of the high ohmic resistance credit indicating light KL, whereby the 0-potential is connected to the arresting magnets V1 . . . V5 respectively R1 . . . R5, and to the selector motor WM via the static make-and-break contact w1, and simultaneously disconnection of selector relay W from the phase potential by the make-and-break contact s2 takes place. The make-and-break contact s4 of the relay S is also switched over. This causes a disconnection of the selector keys 1 . . . 10 from the phase potential of the electrical supply source. On the other hand, the arresting magnet R3 is connected to that electrical potential via the bank contact 6', the connecting member 12 and the working side of the make-and-break switch s4. This causes the arresting magnet R3 to be placed in operative position and, simultaneously therewith, the energizing of the selector motor WM and its preselecting member (not illustrated) moving into abutting contact with this arresting magnet. Furthermore, the contact C1 is intermittently connected to 0-potential by means of a mechanical coupling mechanism (not illustrated). The 0-potential is also connected to the pin magnet AM via the working side of the switched make-and-break contact s3 of the relay S which also causes the energizing of the relay, whereby the bottom side of the third record of group A due to the "projecting" of the corresponding pin is detected and selected. The selector keys A . . . K have in the meantime become ineffective due to the disconnecting from the 0-potential. The credit mechanism KW is stepwise repositioned by the position restorer magnet RM due to the intermittent closing of the contact C1, whereby the connecting member 12 reaches the bank contact 5'. Since the selector relay W, as mentioned above, is not energized, electrical energy supply for the continued running of the selector motor WM and the common terminal of the arresting magnets remains intact. This causes the energizing of the arresting magnet V3 and, after a new short time closing of the contact C1, the energizing of the pin magnet AM, which now projects the detector pin for the top side of the third record of group "A." Simultaneously therewith, due to the renewed stepwise repositioning of the credit mechanism KW, the connecting member 12 of the multicontact switch 11 reaches the position and makes contact with the bank contact 4', whereby the arresting magnet R2 is energized and shortly thereafter the pin magnet AM, due to contact C1, projects the next detector pin for the top side of the second record. This automatic operating cycle does not terminate until the credit in the credit operating unit KE is completely exhausted and thereby the connecting member 12 makes contact with the bank contact 0' so that the credit contact kr opens. Finally the disconnection of relay S from 0-potential, causes deenergization of the relay and opening of its contact s1 which results in deenergizing of the selector motor WM and its stoppage. The respective detector pins of all three records, that is to say of its six sides, have now been projected within group "A," which renders the playing of the desired program of "hit" records which had been selected by means of group selector key 14. As can be noted from the foregoing the maximum number of titles for a predetermined program of "hit" records in the preselection mechanism of this invention must correspond to the number of bank contacts which are connected to the arresting magnets. The bank contacts are selectively connected according to the credit steps of the credit operating unit. Generally a maximum of ten record sides for a program suffices, as for instance, in the embodiment of the circuit diagram.

The aforedescribed switching and circuit arrangement makes a selection operation possible, wherein first individual records are selected by means of selector keys 1 . . . 10, and then by depressing the group selector key 14, an automatic selection of a predetermined program of records is obtained as long as there remains a credit in the credit operating unit. Even when only the last and lowest credit step is present, or when a coin corresponding to this lowest credit step is inserted in the machine, so that the connecting member 12 contacts bank contact 1', one record side, which in the illustrated embodiment corresponds to arresting magnet V1, can be selected as part of the predetermined record program by depressing group selector key 14.

In the circuit diagram the connections between the bank contacts 1' . . . 10' and the arresting magnets V1 . . . V5 and R1 . . . R5 are illustrated as rigid. It is, however, within the scope of this invention to advantageously provide flexible electrical connecting means between the above contacts and magnets, such as for instance separate plug-in type connections. Record manufacturers often combine a very popular number on one side of the record with a less popular number on the other side of the record. By means of flexible connections, a program can be preselected regardless of the combinations of programs selected by the record manufacturer for any one record. For example, when a six step credit has been placed into the credit operating unit, five records are placed in such a manner into the record magazine that the five most popular tune sides correspond to the top sides of the records and are operatively connected to arresting magnets V1 . . . V5, and one of the five bottom sides (the most popular tune) is operatively connected to the arresting magnet R5. For this type of sequential arrangement the following connections have to be made with bank contacts: Arresting magnet R5 to bank contact 6'; V5 to 5'; V4 to 4'; V3 to 3'; V2 to 2', and V1 to 1'.

Taking as one example a record playing machine having a credit capacity of ten credit steps which equals ten playings of record sides, then the circuits as illustrated in the diagram would be most advantageous, because each one of the five records can be selected with its top and bottom sides one after the other.

It will also become apparent that those records belonging to the predetermined program can be operatively connected to a group other than group "A." What is then required is to connect another corresponding pin magnet, instead of pin magnet AM with the working side of the make-and-break contact s3.

Although the present invention has been described in connection with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A preselection mechanism of the character described for a coin operated record playing machine, comprising in combination, an electrical energy source, a plurality of arresting magnets (V1 . . . V5) (R1 . . . R5) operatively mounted in said record playing machine, and electrically operatively connected to said electrical energy source, a corresponding plurality of selector keys (1 . . . 10) operatively mounted in said record playing machine in parallel relationship to said plurality of arresting magnets, a multicontact switch (11) having a plurality of bank contacts (0', 1' . . . 10') operatively mounted in said record playing machine, each one of said plurality of bank contacts being electrically connected to a corresponding arresting magnet of said plurality of arresting magnets (V1 . . . V5) (R1 . . . R5), a connecting member (12) operatively mounted in said multicontact switch (11) and adapted to selectively contact a predetermined bank contact of said plurality of bank contacts (0', 1' . . . 10'), a credit mechanism (KW) operatively connected to said connecting member (12) for controlling its movement, a group selector key (14) operatively mounted in said record playing machine, a first relay (S) operatively electrically connected to said group selector key, fourth switching means (s4) operatively connected to said first relay (S), said first relay (S) being energized when said group selector key (14) has been depressed thereby switching said fourth switching means (s4) and successively energizing a predetermined number of said plurality of arresting magnets (V1 . . . V5) (R1 . . . R5) corresponding to the credit stored in said credit mechanism (KW), first (s1), second (s2) and third (s3) switching means electrically connected to said relay (S), a selector relay (W) electrically connected to said relay (S), and electrically operatively connected to said plurality of selector keys (1 . . . 10), a selector motor (WM) mounted in said record playing machine and operatively connected to its electrical energy source via the circuit of said relay (S) and via the electrical energy circuit of said plurality of arresting magnets (V1 . . . V5) (R1 . . . R5), a plurality of pin magnets (AM . . . JM) (BM . . . KM) operatively mounted in said record player and electrically operatively connected to said electrical energy source, whereby when said group selector key (14) is depressed said plurality of selector keys (1 . . . 10) and said selector relay (W) are disconnected from said electrical energy source by said relay (S) which causes switching of said first (s1), second (s2) and third (s3) switching means whereas a preselected one (AM) of said pin magnets (AM . . . JM) (BM . . . KM) is energized by said electrical energy source due to switching of said third switching means (s3) thereby projecting its pin for selecting a predetermined record, said relay (S)

further causing a short time energizing, which takes place only during the selection operation, of said selector motor (WM).

2. The preselection mechanism as set forth in claim 1, wherein said connecting member (12) of said multicontact switch (11) is adapted to make sliding contact with a predetermined one of said plurality of bank contacts (0', 1' . . . 10'), ano including a shaft (13) operatively connected to said connecting member (12) and thereby controlling its position with respect to said plurality of bank contacts, said shaft (13) being operatively connected to said credit mechanism (KW).

No references cited.

NEIL C. READ, *Primary Examiner.*

H. I. PITTS, *Assistant Examiner.*